(12) United States Patent
Miyamoto et al.

(10) Patent No.: US 7,277,567 B2
(45) Date of Patent: Oct. 2, 2007

(54) MEDICAL VISIBLE IMAGE GENERATING METHOD

(75) Inventors: Masaki Miyamoto, Tokyo (JP); Shogo Azemoto, Tokyo (JP)

(73) Assignee: Office Azemoto, Ltd., Tokyo (JP)

( * ) Notice: Subject to any disclaimer, the term of this patent is extended or adjusted under 35 U.S.C. 154(b) by 872 days.

(21) Appl. No.: 10/610,671

(22) Filed: Jul. 2, 2003

(65) Prior Publication Data

US 2004/0017370 A1     Jan. 29, 2004

(30) Foreign Application Priority Data

Jul. 26, 2002   (JP)   ............................. 2002-218952

(51) Int. Cl.
  *G06K 9/00*   (2006.01)
(52) U.S. Cl. ...................... 382/131; 345/426; 600/473; 382/128; 382/162
(58) Field of Classification Search ........ 382/128–134, 382/162, 164, 165, 170; 600/310, 473; 345/426
See application file for complete search history.

(56) References Cited

U.S. PATENT DOCUMENTS 6,816,743 B2 * 11/2004 Moreno et al. ............. 600/473

2002/0164060 A1 * 11/2002 Paik et al. .................. 382/128

OTHER PUBLICATIONS

Levoy, Marc, "Efficient Ray Tracing of Volume Data", *ACM Transactions on Graphics*, Jul. 1990, pp. 245-261, vol. 9, No. 3.
PIXEL, No. 121, pp. 130-137, Oct. 1992.

* cited by examiner

*Primary Examiner*—Matthew C. Bella
*Assistant Examiner*—Shefali Patel
(74) *Attorney, Agent, or Firm*—Snider & Associates; Ronald R. Snider

(57) ABSTRACT

According to a distribution of image data values corresponding to individual spatial coordinate points on a three-dimensional space obtained when a region to be observed is tomographically taken by a radiographic medical diagnosis system, an interpolation area is provided within a segment set within a range of the image data values. In the interpolation area, degrees of chromaticity and opaqueness of each spatial coordinate point are made variable in response to the magnitude of image data value. The degrees of chromaticity and opaqueness of all the spatial coordinate points located on each line of sight connecting each plane coordinate point on a two-dimensional projection plane and a point of view are respectively integrated, and thus integrated values are reflected on the plane coordinate points on the line of sight.

5 Claims, 5 Drawing Sheets

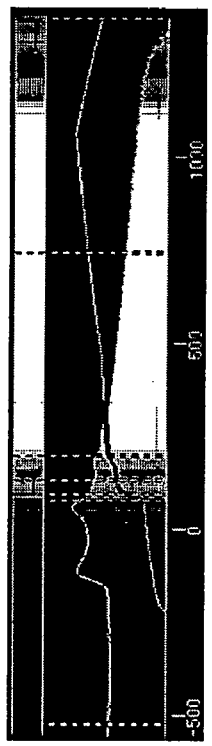
FIG.3A
FIG.3B

MEDICAL VISIBLE IMAGE GENERATING METHOD

RELATED APPLICATIONS

This application claims the priority of Japanese Patent Application No. 2002-218952 filed on Jul. 26, 2002, which is incorporated herein by reference.

BACKGROUND OF THE INVENTION

1. Field of the Invention

The present invention relates to a medical visible image generating method for generating a visible image of a region to be observed such as abdomen or head including a plurality of kinds of organic tissues such as organs like liver and pancreas, blood vessels, and tumors by using CG (computer graphics) processing and the like according to image data values such as CT values obtained from medical images tomographically taken by using radiographic diagnosis systems such as CT (computed tomography), MRI (magnetic resonance imaging), nuclear medicine, CR (computed radiography), DSA (digital subtraction angiography), and DR (digital radiography) (real time).

2. Description of the Prior Art

There has recently been an increasing demand for tomograpically taking a medical image from a region to be observed such as abdomen by a radiographic medical diagnosis system such as CT, generating a visible image visualizing the region to be observed therefrom, and using this visible image for various purposes such as explanations for patients, academic uses, and surgical planning.

Conventionally known as a technique for generating such a visible image by CG processing is one called volume rendering. First, in a medical visible image generating method using volume rendering, voxels constituting individual spatial coordinate points of a three-dimensional space corresponding to a tomographic region are used for representing a spatial distribution of image data values such as CT values obtained when a region to be observed is tomographically taken. Subsequently, assuming that a line of sight connects a pixel constituting each plane coordinate point of a two-dimensional projection plane and a point of view (projection center), the degree of chromaticity (the degree of color to be rendered) and the degree of opaqueness (the degree of visibility therethrough) are determined for each voxel according to image data values of voxels located on the line of sight. Then, the degrees of chromaticity and opaqueness determined for the individual voxels located on each line of sight are respectively integrated, and thus integrated values are reflected on pixels of a two-dimensional plane located on the lines of sight, so as to generate a two-dimensional visible image of the region to be observed.

By utilizing the fact that image data values obtained by tomography have respective distribution states specific to individual organic tissues, the above-mentioned conventional medical visible image generating method divides the range of image data values into a plurality of segments according to a distribution (histogram) of all the image data values obtained, and sets degrees of chromaticity and opaqueness having their predetermined values within each segment with respect to individual spatial coordinate points having image data values within the segment.

Such a method of setting degrees of chromaticity and opaqueness may be problematic as follows. In the case of organic tissues whose image data values (CT values) differ greatly from each other, as in bone and soft tissues shown in FIG. 5A, they can completely be separated from each other according to the difference in CT values. Therefore, even when predetermined degrees of chromaticity and opaqueness are set in each segment, visualization can be effected such that the difference between these tissues can be seen as shown in FIG. 5B. In the case of organic tissues whose CT values yield a small difference therebetween, as in soft tissue and blood vessel shown in FIG. 6A, they cannot completely be separated from each other according to the difference in CT values. Therefore, as shown in FIG. 6B for example, segments for discriminating the tissues from each other are set at a position where their distributions overlap each other, and predetermined degrees of chromaticity and opaqueness are set for each segment. However, it has been difficult for such a method to effect visualization by which the difference between the tissues can be seen clearly.

Also, in order to speed up the process of arithmetic operations for respectively integrating the degrees of chromaticity and opaqueness of pixels located on each line of sight, the conventional method carries out arithmetic operations while thinning out data concerning a part of voxels. Therefore, visualized images have failed to express delicate feels of color and opaqueness between organic tissues.

SUMMARY OF THE INVENTION

In view of such circumstances, it is an object of the present invention to provide a medical visible image generating method which can generate, according to an image data value obtained upon a tomography by a radiographic medical diagnosis system, a visible image which can clearly distinguish different organic tissues from each other while expressing delicate feels of color and opaqueness between the organic tissues.

For achieving the above-mentioned object, the present invention provides a medical visible image generating method which comprises dividing, according to a distribution of image data values respectively corresponding to spatial coordinate points on a three-dimensional space obtained when a region to be observed including a plurality of kinds of organic tissues is tomographically taken by a radiographic medical diagnosis system, a range of the image data values into a plurality of segments; setting a degree of chromaticity and a degree of opaqueness for each spatial coordinate point in each segment according to the image data values within the segment; and comprises generating, according to the degrees of chromaticity and opaqueness in each spatial coordinate point, a visible image formed by projecting the region to be observed onto a two-dimensional plane; the method further comprising the steps of respectively integrating the degrees of chromaticity and opaqueness of all the spatial coordinate points located on each line of sight connecting each plane coordinate point on the two-dimensional plane and a point of view, and reflecting the integrated values on the plane coordinate points on the line of sight; and setting an interpolation area in the segment and continuously changing, according to a magnitude of the image data value in the interpolation area, the degrees of chromaticity and opaqueness set in the segment.

The "organic tissues" refer to animal organs including internal organs such as liver and lung, circulatory systems such as heart and blood vessel, and nerve systems such as brain; bone tissues; and affected areas such as tumor.

In the medical visible image generating method of the present invention, an adjustment sensitivity for adjusting a state of change of the degree of opaqueness in the interpolation area may be made greater in a range with a lower degree of opaqueness.

The integration may be carried out according to an alpha blending rule, whereas the integrated values may be reflected on the plane coordinate points according to volume rendering.

A curve representing a function for relating the degrees of chromaticity and opaqueness to the image data values may be displayed on a screen, and thus displayed function curve may be adjusted on the screen.

Preferably, in this case, the function curve is adjusted by an operation in contact with the screen.

BRIEF DESCRIPTION OF THE DRAWINGS

FIG. 3A is a view showing an example of visible abdomen image generated by the method of the present invention, whereas FIG. 3B is a view showing a comparative example thereof;

DESCRIPTION OF THE PREFERRED EMBODIMENTS

Figure 1:
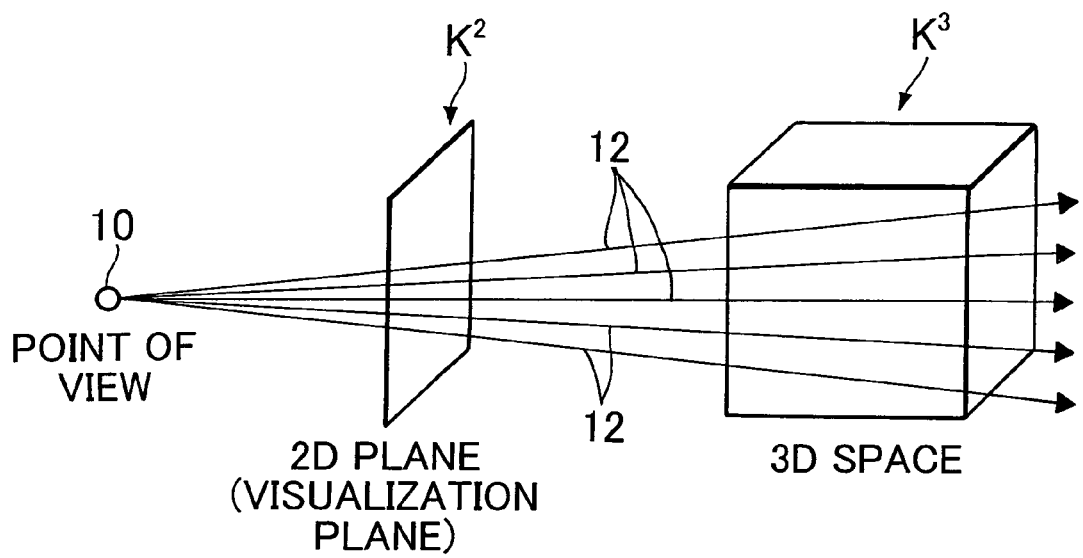
FIG. 1 is a schematic view showing an outline of a procedure of processing image data values in the method in accordance with an embodiment of the present invention.
Figure 2:
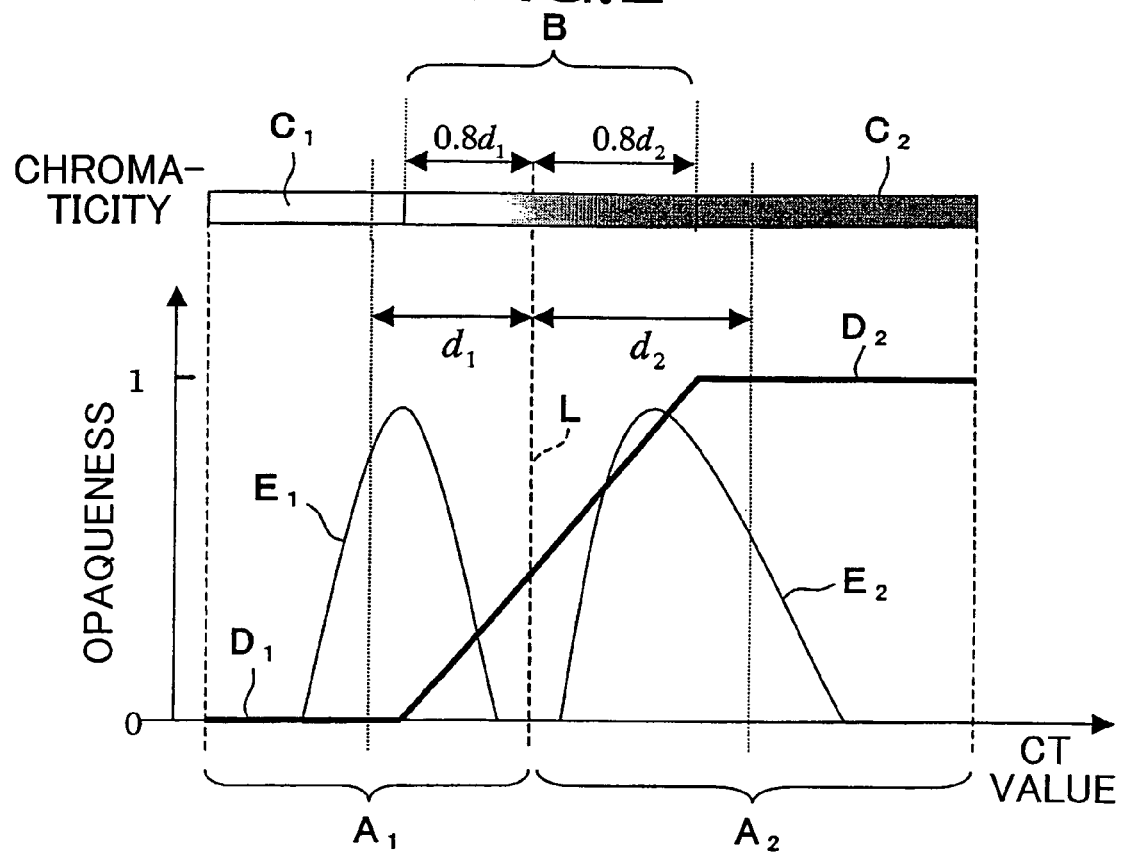
FIG. 2 is a chart showing an outline of a procedure of setting degrees of chromaticity and opaqueness in segments set.

In the following, an embodiment of the present invention will be explained with reference to the drawings. FIG. 1 is a schematic view showing a procedure of processing image data values in a medical visible image generating method in accordance with an embodiment of the present invention, whereas FIG. 2 is a chart showing a procedure of setting degrees of chromaticity and opaqueness in segments set within a range of image data values. The following explanation will exemplify a case where a visible image of an abdomen including a plurality of kinds of organic tissues such as organs like liver, blood vessels, and bones is generated according to CT values obtained when the abdomen is tomographically taken by a CT apparatus.

In the method of this embodiment, as shown in FIG. 1, voxels constituting respective spatial coordinate points of a three-dimensional space $K^3$ corresponding to a tomographic region are initially used for representing a spatial distribution of CT values (image data values) of the abdomen obtained by the CT apparatus.

Subsequently, with reference to a frequency distribution (two-dimensional histogram) of CT values, thus obtained range of CT values is divided into a plurality of segments, and the degree of chromaticity (in which R, G, and B take respective values within the range of 0 to 255) and degree of opaqueness (taking a value within the range of 0 to 1) corresponding to the CT values within each segment are set in this segment. Though the conventional method sets predetermined values of chromaticity and opaqueness within each segment, the method of this embodiment sets degrees of chromaticity and opaqueness according to the following procedure.

As shown in FIG. 2, a case where segments $A_1$ and $A_2$ separated from each other by a boundary line L are set within the range of CT values will be explained by way of example. First, respective reference degrees of chromaticity $C_1$, $C_2$ and opaqueness $D_1$, $D_2$ are set for the segments $A_1$, $A_2$. The example shown in FIG. 2 illustrates a case where the reference degree of opaqueness $D_1$ for the segment $A_1$ is 0 whereas the reference degree of opaqueness $D_2$ for the segment $A_2$ is 1. Subsequently, an interpolation area B is set at a position overlapping the boundary line L, and a chromaticity function defining a relationship between the CT value and degree of chromaticity, and an opaqueness function defining a relationship between the CT value and degree of opaqueness are set for determining degrees of chromaticity and opaqueness within the interpolation area B. In the example shown in FIG. 2, a proportional function performing linear interpolation between the reference degrees of chromaticity $C_1$ and $C_2$ is set for the chromatic function whereas a proportional function performing linear interpolation between the reference degrees of opaqueness $D_1$ and $D_2$ is set for the opaqueness function.

For setting the interpolation area B, an area to be subjected to interpolation is initially defined so as to extend leftward and rightward from the boundary line L by predetermined distances. The example shown in FIG. 2 illustrates a case where the area to be subjected to interpolation extends leftward by a distance $d_1$ which is about the half of the width of the segment $A_1$, and rightward by a distance $d_2$ which is about the half of the width of the segment $A_2$. Subsequently, an interpolating range is defined within the area to be subjected to interpolation. The area to be subjected to interpolation and the interpolating range within this area are defined according to distributions $E_1$, $E_2$ of CT values within the segments $A_1$, $A_2$ and the like.

When a value by which the area to be subjected to interpolation is multiplied in order to calculate the interpolating range is referred to as vividness (taking a value from 0 to 1), the case with a vividness of 0 yields the same setting as the conventional method in which the degrees of chromaticity and opaqueness do not change within the segments. When the vividness is set to 1, linear interpolation is performed in the whole area to be subjected to interpolation. When the area to be subjected to interpolation is set so as to cover all of the segments $A_1$ and $A_2$, linear interpolation is performed throughout the segments $A_1$ and $A_2$. FIG. 2 shows an example where the vividness is set to 0.8. Such a procedure of setting degrees of chromaticity and opaqueness is carried out in the obtained range of CT values, so as to determine degrees of chromaticity and opaqueness corresponding to CT values in each segment.

After the degrees of chromaticity and opaqueness for each voxel are determined, a line of sight 12 connecting a pixel representing each plane coordinate point of a two-dimensional plane (visualization plane) $K^2$ for projection (e.g., an imaging plane of CCD or the like or an image plane of a display or the like) and a point of view (projection center) 10 is assumed as shown in FIG. 1. Subsequently, the degrees of chromaticity and opaqueness of all the voxels located on each line of sight 12 are respectively integrated according to the following expression (1) known as an alpha blending rule:

$$P = \alpha(V_0) \times c(V_0) + \sum_{i=1}^{n} \left( \left( \prod_{j=0}^{i-1} (1 - \alpha(V_j)) \right) \times \alpha(V_i) \times c(V_i) \right) \quad (1)$$

where

P is the degrees of chromaticity and opaqueness corresponding to each pixel of a two-dimensional plane;

V is the CT value of each voxel on a line of sight;

α is the opaqueness function (0 to 1); and c is the chromatic function (R, G, and B in 0 to 255).

By volume rendering, thus obtained integrated values are reflected on each pixel of the two-dimensional plane $K^2$ located on the lines of sight 12, so as to generate a two-dimensional visible image of an abdomen as a region to be observed.

FIGS. 3A and 3B show an example of visible abdomen image generated by the method of this embodiment, and a comparative example thereof, respectively. FIG. 3A shows a visible image generated by the method of this embodiment. FIG. 3B shows a visible image generated when degrees of chromaticity and opaqueness were gradually changed in the boundary between segments whereas they were set to their predetermined values within each segment as in the conventional method.

As can be seen from FIGS. 3A and 3B, it has been verified that the visible image generated by the method of this embodiment thinly visualizes the liver region and depicts blood vessels therein, so that they can clearly be discriminated from each other, while being able to express more delicate color changes as compared with the comparative example, thus yielding a high-quality image.

Also, in the method of this embodiment, curves (lines) representing chromaticity functions and opaqueness functions are shown on a display screen of a computer together with values of chromaticity and opaqueness with respect to CT values, so that users such as doctors can change thus displayed function curves with fingers, pens, or the like in contact therewith on the screen, thereby adjusting them. In particular, values of opaqueness vs. CT values are not displayed directly but after being subjected to the correction function of the following expression (2):

$$f(x) = \sqrt{x} \quad (2)$$

where x is the value of opaqueness corresponding to a CT value; and f is the display function of the degree of opaqueness.

Figure 4:
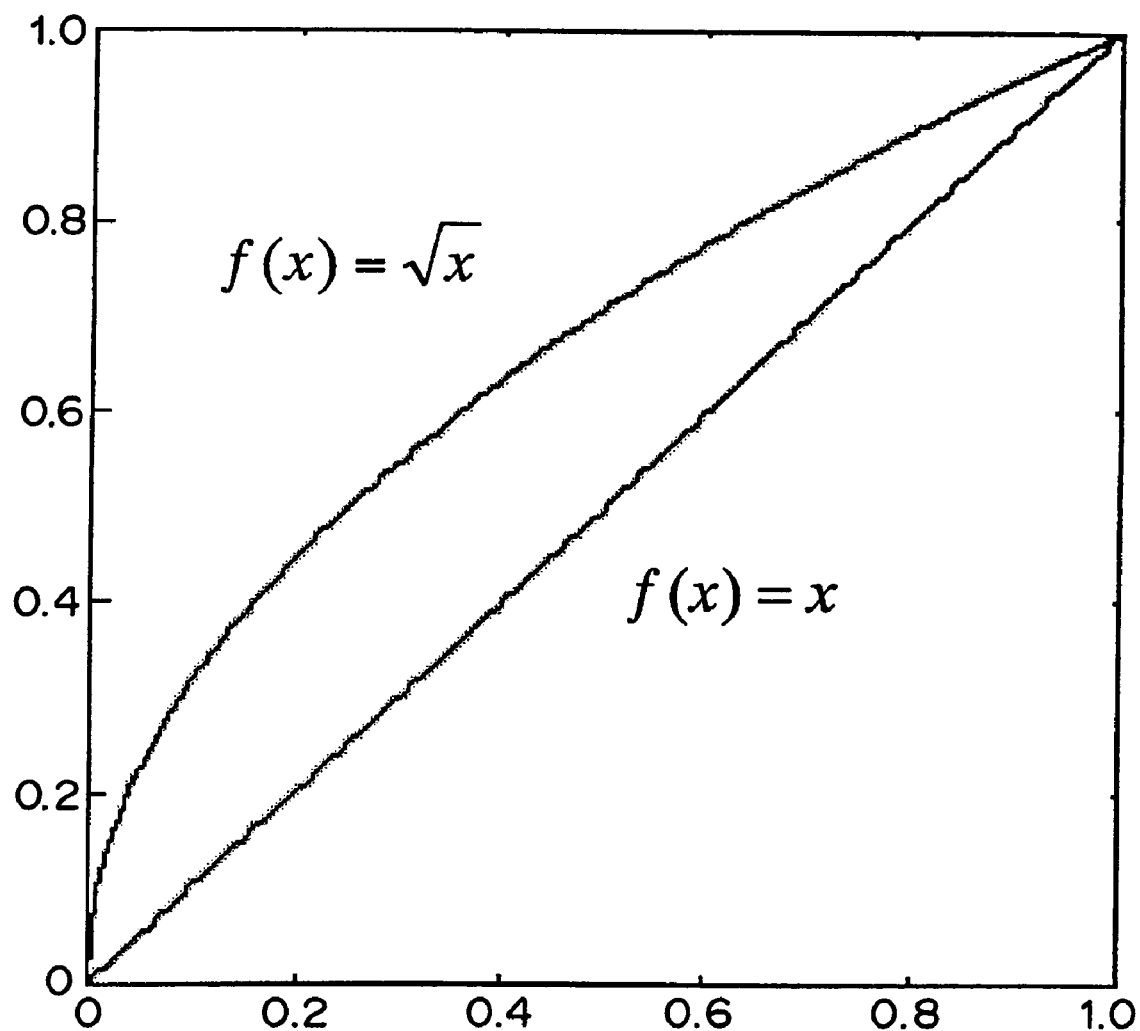
FIG. 4 is a chart showing a function representing the value of degree of opaqueness vs. CT value, together with a function of the comparative example.
Figure 5A:
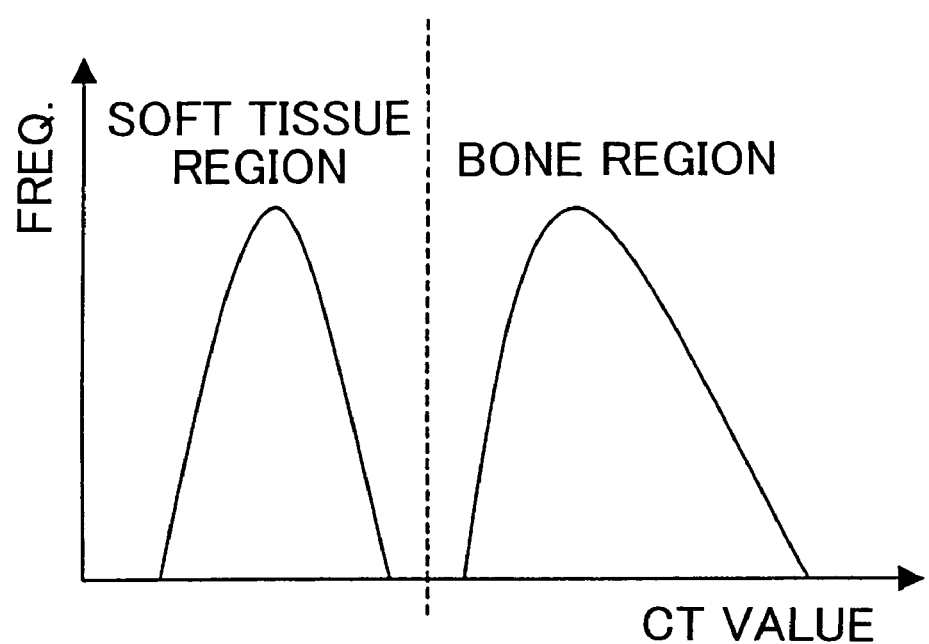
FIGS. 5A and 5B are charts showing a procedure of setting degrees of chromaticity and opaqueness within segments in accordance with the prior art.
Figure 5B:
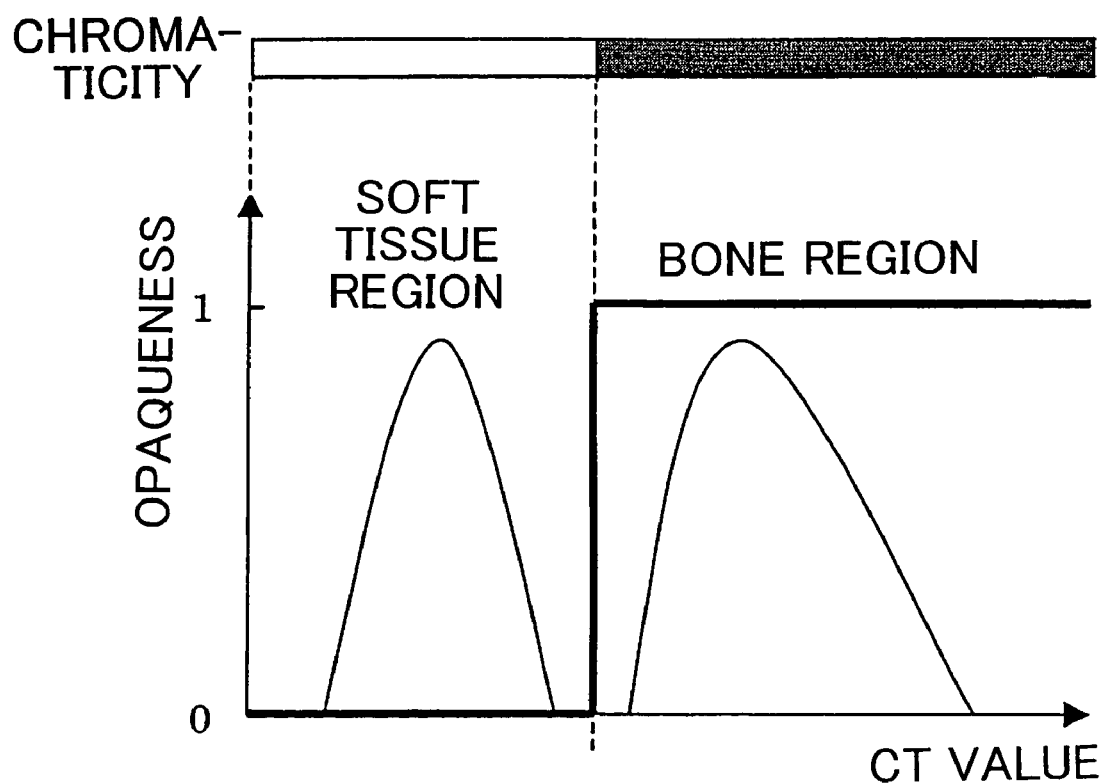
Figure 6A:
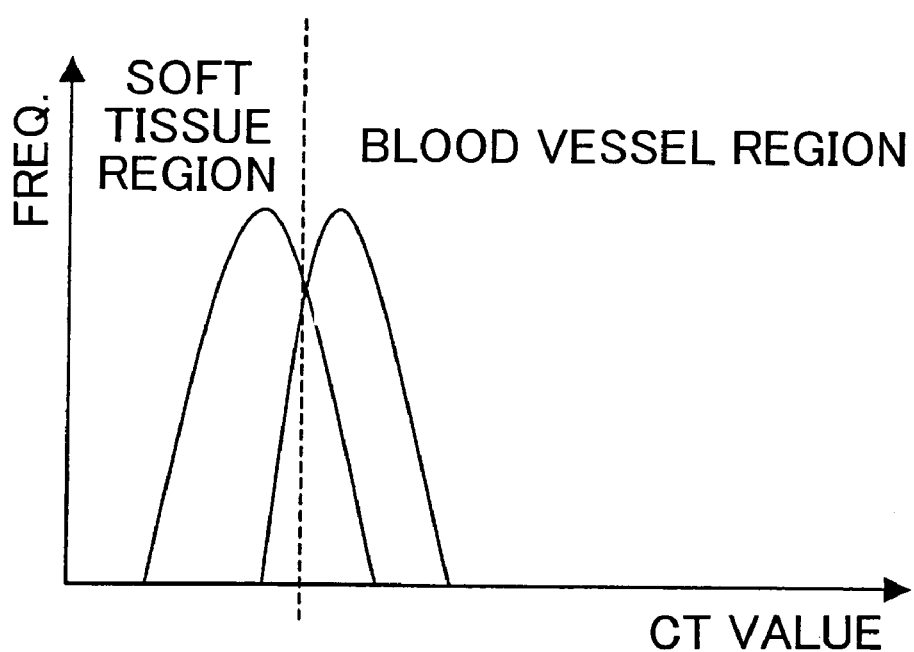
FIGS. 6A and 6B are charts showing a procedure of setting degrees of chromaticity and opaqueness within segments in accordance with the prior art.
Figure 6B:
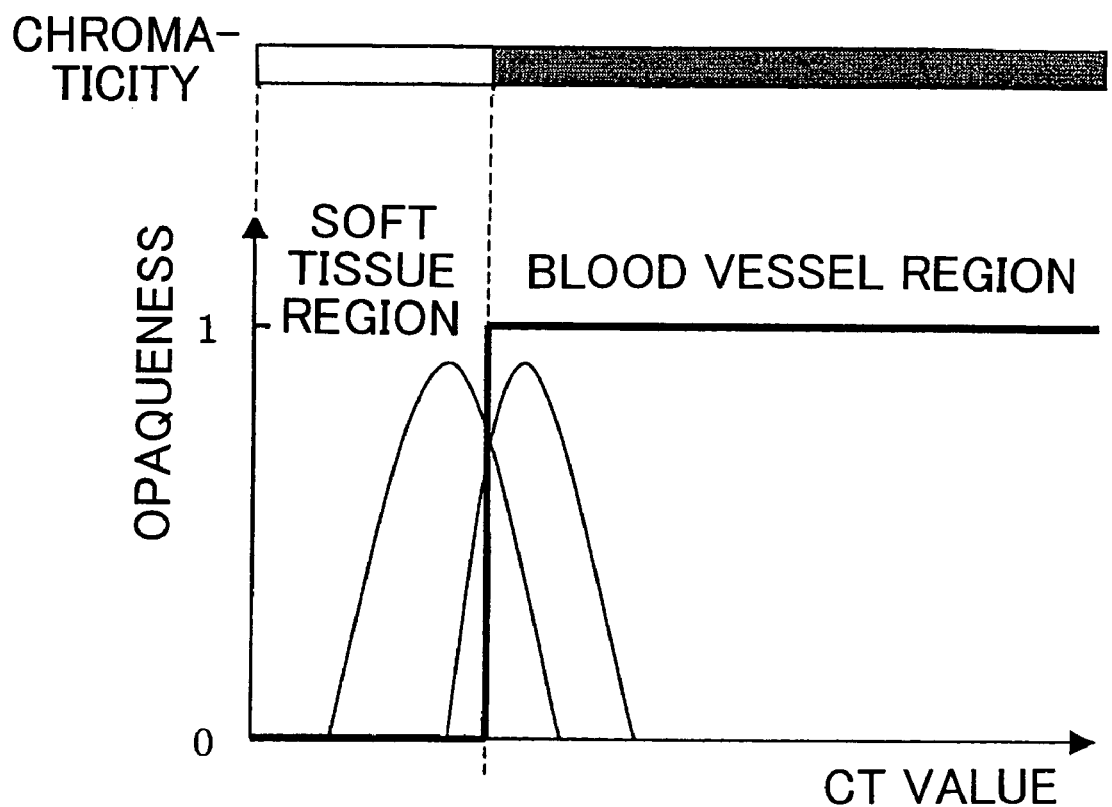

When such a displaying method is employed, the adjustment range (the range in the ordinate) becomes wider in values near 0 as compared with the case where values of opaqueness are displayed as they are (in the case of f(x)=x shown in FIG. 4). This makes the adjustment sensitivity for the degree of opaqueness greater in a range with a lower degree of opaqueness, thereby facilitating the adjustment. Therefore, delicate changes can be attained in the degree of opaqueness in the adjustment effected by users, whereby delicate color changes can be expressed in generated visible images as well.

Without being restricted to the above-mentioned embodiment, the medical visible image generating method of the present invention can be modified in various manners.

For example, though the chromaticity function and opaqueness function in the interpolation area are explained as linear ones in the above-mentioned embodiment, various functions such as logarithmic functions can be used therefor as appropriate.

Though the above-mentioned embodiment relates to a case generating a medical visible image of an abdomen, the region to be observed may be other organic parts such ad head and lung.

The present invention is applicable not only to medical images taken by CT apparatus, but also to those captured by any of radiographic diagnosis systems such as MRI, nuclear medicine, CR, DSA, and DR or combinations of these systems.

As explained in detail in the foregoing, according to a distribution of image data values corresponding to individual spatial coordinate points on a three-dimensional space obtained when a region to be observed is tomographically taken by a radiographic medical diagnosis system, the medical visible image generating method of the present invention provides an interpolation area within a segment set within a range of the image data values, and sets the degrees of chromaticity and opaqueness of each spatial coordinate point such that they continuously change in response to the magnitude of image data value in the interpolation area. Also, the degrees of chromaticity and opaqueness of all the spatial coordinate points located on each line of sight connecting each plane coordinate point on a two-dimensional plane generating a visible image and a point of view are respectively integrated, and thus integrated values are reflected on the plane coordinate points on the line of sight. Such a configuration can generate a visible image which can clearly distinguish different organic tissues from each other while expressing delicate feels of color and opaqueness between the organic tissues within the region to be observed.

What is claimed is:

1. A medical visible image generating method comprising:

dividing, according to a distribution of image data values respectively corresponding to spatial coordinate points on a three-dimensional space obtained when a region to be observed including a plurality of kinds of organic tissues is tomographically taken by a radiographic medical diagnosis system, a range of said image data values into a plurality of segments; setting a degree of chromaticity and a degree of opaqueness for each spatial coordinate point in each segment according to said image data values within said segment;

generating, according to said degrees of chromaticity and opaqueness in each spatial coordinate point, a visible image formed by projecting said region to be observed onto a two-dimensional plane; said method further comprising the steps of:

respectively integrating said degrees of chromaticity and opaqueness of all said spatial coordinate points located on each line of sight connecting each plane coordinate point on said two-dimensional plane and a point of view, and reflecting said integrated values on said plane coordinate points on said line of sight; and setting an interpolation area in said segment and continuously changing, according to a magnitude of said image data value in said interpolation area, said degrees of chromaticity and opaqueness set in said segment.

2. A medical visible image generating method according to claim 1, wherein an adjustment sensitivity for adjusting a state of change of said degree of opaqueness in said interpolation area is greater in a range with a lower degree of opaqueness.

3. A medical visible image generating method according to claim 1, wherein said integration is carried out according to an alpha blending rule; and wherein said integrated values are reflected on said plane coordinate points according to volume rendering.

4. A medical visible image generating method according to claim 1, wherein a curve representing a function for relating said degrees of chromaticity and opaqueness to said image data values is displayed on a screen, said displayed function curve being adjustable on said screen.

5. A medical visible image generating method according to claim 4, wherein said function curve is adjusted by an operation in contact with said screen.

* * * * *